Oct. 13, 1964   R. S. FRYE ETAL   3,152,604
VENT VALVE ASSEMBLY
Filed June 21, 1963   2 Sheets-Sheet 1
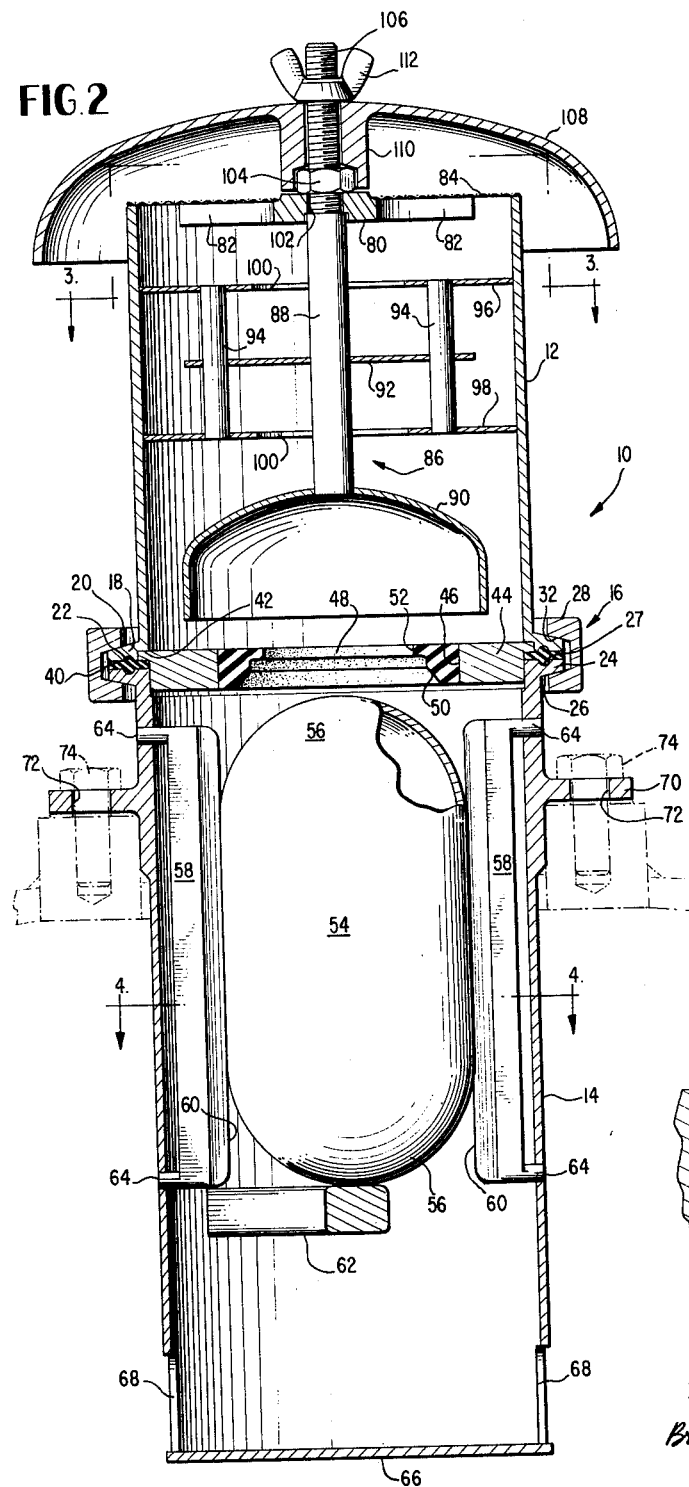
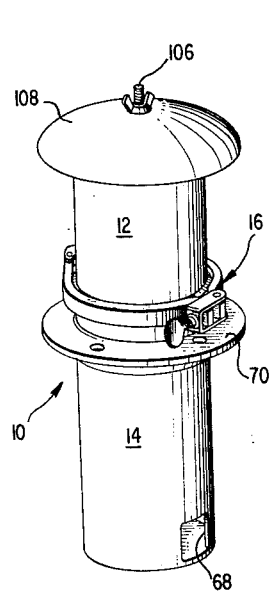
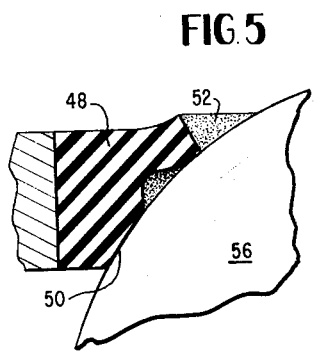
INVENTORS
ROBERT S. FRYE
GEORGE T. GUNNELL, JR.
BY Brown, Schuyler and Beveridge
ATTORNEYS

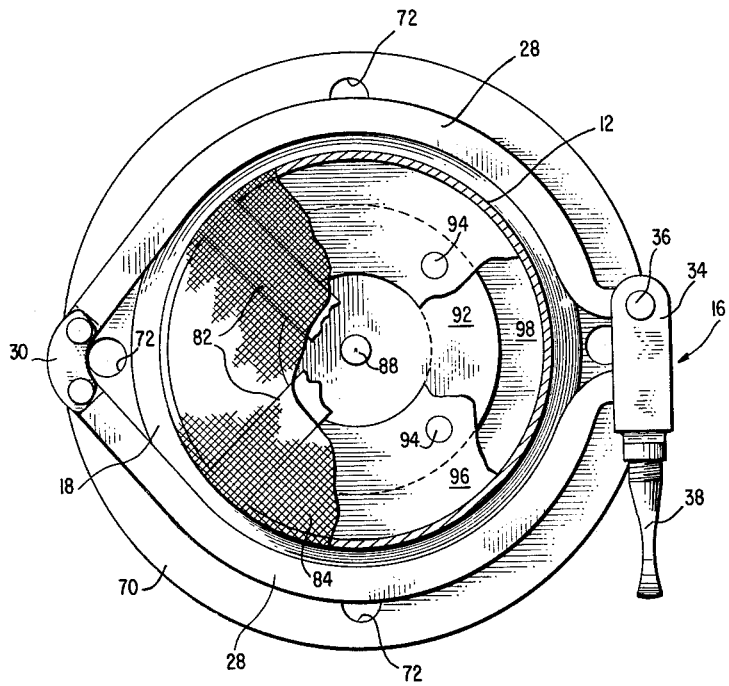
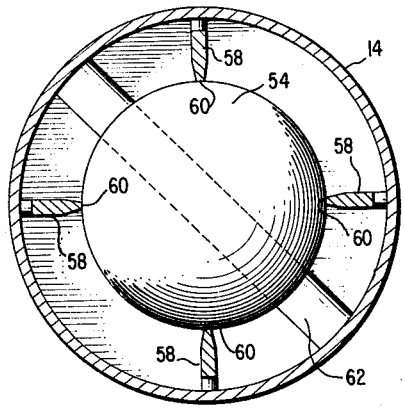

United States Patent Office 3,152,604
Patented Oct. 13, 1964

3,152,604
VENT VALVE ASSEMBLY
Robert S. Frye, Atlanta, and George T. Gunnell, Jr., Lithia Springs, Ga., assignors to The Coca-Cola Company, Atlanta, Ga., a corporation of Delaware
Filed June 21, 1963, Ser. No. 289,667
9 Claims. (Cl. 137—202)

This invention relates to vent valve assemblies for venting the head space of closed liquid containing tanks while preventing the egress of liquid from the tank through the vent opening.

The valve assembly of the present invention, while well adapted for use in other environments, is especially designed for use in venting the tanks of tank trucks or railway cars used for the bulk transport of viscous liquids, in particular soft drink syrups. Venting of the liquid carrying tanks is essential to maintain the head space above the surface of liquid within the tanks constant to prevent the formation of vacuum within the tank which can result from surging of the liquid within the tank caused by uneven motion of the transporting vehicle. The valve assembly must be so designed that the head space is in constant communication with the atmosphere while, at the same time, the venting passage is closed when surging eliminates the head space at the venting valve location.

In the specific case of a viscous fluid such as soft drink syrups or other fluids having a sugar base, further problems are presented in that surfaces of the vent valve contacted by the liquid become sticky, thus tending to interfere with the proper operation of the valve. In the case where the liquid being transported is for human consumption, sanitary codes enforce rigid requirements of cleanliness and sanitation.

Accordingly, it is an object of the present invention to provide a vent valve assembly for venting the head space of a liquid containing tank which is operable to prevent the egress of liquid from the tank and which is provided with a minimum area of relatively movable contacting surfaces to minimize interference to operation of the valve occasioned by use with viscous or sticky liquids.

It is another object of the invention to provide a vent valve assembly which can be readily disassembled for cleaning without requiring the dismounting of the entire assembly from the tank.

The foregoing, and other objects, are achieved in a vent valve assembly in which a vertically elongate hollow tubular venting passage is defined by two coaxial tubular members detachably secured in end-to-end relationship with each other. A mounting flange is located on the lower of the two tubular members, and the lower member is permanently mounted in place upon the tank by means of the mounting flange. The detachable coupling which secures the two tubular members in end-to-end relationship with each other is located above the mounting flange so that the coupling may be removed to disassemble the valve for cleaning purposes. A float member is retained within the lower of the two tubular members and a valve plate is clamped between the abutting ends of the two tubular members for cooperation with the valve float to close the venting passage in the event liquid rises within the tubular member. Preferably, the valve float is an elongate hollow cylindrical member having hemispherical ends so that, in the event of damage to one end, the float can be reversed. The float is guided within the lower member by axially extending vanes having relatively thin guiding surfaces engageable with the cylindrical side portions of the float.

The lower end of the lower tubular member is closed, and communication with the interior of the lower member is through holes extending through the vertical side wall of the member. This prevents a direct vertical surge of liquid within the valve assembly. Above the valve plate, in the interior of the upper tubular member, a detachable baffle assembly is supported from a spider mounted at the top of the upper tubular member. A screen covers the opening at the upper end of the hollow tubular member and above the screen, an umbrella-like cap assembly is provided to prevent the entrance of rain, etc. into the valve assembly from its upper end. The cap and baffle assembly are cooperatively mounted upon the spider.

Other objects and features of the invention will become apparent by reference to the following specification and to the drawings.

In the drawings:

FIG. 1 is a perspective view of a vent valve assembly embodying the invention;

FIG. 2 is a central vertical cross-sectional view through the vent valve assembly of FIG. 1, indicating in broken lines, the manner in which the assembly is mounted on the upper surface of a tank;

FIG. 3 is a cross-sectional view, with certain parts broken away and others shown in section taken approximately on line 3—3 of FIG. 2;

FIG. 4 is a cross-sectional view taken on line 4—4 of FIG. 2; and

FIG. 5 is an enlarged fragmentary sectional view showing the valve in the fully closed position.

Referring first to FIG. 2, a vent valve assembly designated generally 10 includes upper and lower hollow tubular members 12 and 14 respectively which are detachably secured to each other in coaxial end-to-end relationship by a clamping assembly designated generally 16. The lower end of upper member 12 is formed with an outwardly projecting annular flange 18 having a downwardly and outwardly inclined upper surface 20 and a gasket seating groove 22 formed in its lower surface. At the upper end of lower member 14 a similar flange 24 is formed, with an upwardly and outwardly inclined lower surface 26 and a corresponding gasket seating groove 27 in its upper surface.

As best seen in FIGS. 1 and 3, clamp assembly 16 includes a pair of clamp members 28 connected to each other at one end by a pivot assembly 30 and having on their internal surfaces a groove 32 having inclined side walls complementary to inclined surfaces 20 and 26 of the flanges on members 12 and 14. At the end of one member 28 remote from pivotal connection 30, a clamping bracket 34 is pivotally mounted as at 36 and carries a clamping screw 38 which can be engaged with the adjacent end of the other clamping member 28 to force these two ends of the respective member 28 toward each other by tightening of screw 38. The clamping action of screw 38 is applied through the inclined surfaces of grooves 32 to squeeze the opposed faces of flanges 20 and 24 toward each other to compress a resilient sealing gasket 40 disposed between the opposed flange faces.

As best seen in FIG. 2, flange 20 is also recessed around its inner periphery as at 42 to receive a peripheral lip formed on a circular valve plate 44 to mount the valve plate within the venting passage defined by members 12 and 14 with the valve plate located substantially at the juncture of the adjacent ends of members 12 and 14.

Valve plate 44 is formed with a central circular opening 46 within which is mounted an annular valve seat member 48 which is formed of an elastic, deformable material, preferably pure gum rubber, and has an inclined sealing surface 50, of spherical surface contour, extending around the lower portion of its inner periphery as shown in FIGS. 1 and 5. Valve seat member 48 also includes a sealing lip 52 which is preferably an integral part of the seat member and projects radially inwardly when the valve is in the open position as shown in FIG. 1. As discussed more fully hereinafter, lip 52 is engaged and deflected upwardly by float 54 when the latter is fully seated (see FIG. 5).

Communication between the interior of lower member 14 and the interior of upper member 12 via the opening defined by valve seat 48 is controlled by an elongate float 54 which is located in the interior of member 14. Float 54 is of elongate cylindrical shape and is formed with hemispherical end portions 56 of a diameter such as to first engage and deflect sealing lip 52 upwardly then seal against correspondingly curved surface 50 when float 54 is elevated into fully seated engagement with valve seat member 48.

Float 54 is guided in vertical movement within tubular member 14 in operative alignment with valve seat member 48 by a plurality of axially extending vanes 58 which, as best seen in FIG. 4, are formed with relatively thin, vertically extending guide edge surfaces 60 which are disposed in loose sliding engagement with the cylindrical central portion of float 54. A web 62 is mounted within member 14 and extends diametrically across the interior of member 14 to define a lower limit of movement of float 54 within member 14. Both web 62 and guiding vanes 58 are permanently mounted in the interior of member 14, vanes 58 being formed with projections 64 of circular cross-section which are received and welded in bores drilled through the wall of member 14 at appropriate locations.

The lower end of member 14 is closed by a circular plate 66 which is permanently secured, as by welding or brazing, to the lower end of member 14. Inlets to the lower member 14 are defined by a pair of diametrically opposed openings 68 cut through the vertical side walls of member 14.

At a location spaced below the upper end of member 14, an outwardly projecting annular mounting flange 70 is formed on member 14 and is bored as at 72 to receive mounting screws 74 to mount the valve assembly in position upon the upper wall of a tank partially illustrated in broken line in FIG. 2 at 76.

Referring now to upper member 12, at the upper end of member 12, a cross-shaped spider having a central hub 80 and four radially extending arms 82 is fixedly secured, as by welding, to the top of member 12. A relatively fine mesh screen 84 is also permanently secured in position at the top of member 12 and extends completely from central hub 80 to the periphery of member 12 to completely screen the upper end of member 12.

Spider 80–82 is employed to support a baffle assembly designated generally 86 in the interior of upper member 12. Baffle assembly 86 includes a vertically extending central stem 88 having an inverted cup-shaped splash guard 90 mounted at its lower end to overlie the opening in valve seat 48. A first circular baffle plate 92 is fixedly mounted on central stem 88 and four auxiliary stem members 94 are in turn fixedly secured to baffle plate 92 at symmetrically spaced locations near the outer periphery of plate 92. Auxiliary stems 94 serve to support upper and lower baffle plates 96 and 98 respectively, plates 96 and 98 being secured to the upper and lower ends of stems 94 so that the three baffle plates 92, 96 and 98 are supported from central stem 88. Upper and lower baffle plates 96 and 98 extend substantially to the inner periphery of upper member 12 and are formed with centrally located circular openings 100, the diameter of openings 100 being substantially less than the outer diameter of central baffle plate 92 to thereby define a tortuous passage through upper member 12.

Spider hub 80 is provided with a central bore 102 through which stem 88 projects upwardly above the upper end of member 12. Cooperating shoulders in bore 102 and on stem 88 locate the stem vertically with respect to spider hub 80. The stem and baffle assembly 86 are secured in position within member 12 by a nut 104 which is received on the threaded upper end 106 of stem 88.

An umbrella-like cap member 108 is mounted in spaced overlying and surrounding relationship with the upper end of upper member 12. Cap 108 is formed with a central hub 110 which is bored and recessed to receive threaded stem section 106 and nut 104 and a wing nut 112 threaded onto threaded section 106 is employed to retain cap 108 in its assembled position.

In use, the vent valve assembly is mounted in the top wall of a closed tank in the manner illustrated in FIG. 2, a portion of the tank top wall being shown in broken line. The lower end of lower member 14 projects downwardly into the interior of the tank and suitable sealing means, not shown, are provided to seal member 14 to the bore in the tank wall through which lower member 14 projects. As previously stated, the vent valve assembly disclosed in this application is designed with the specific end use of venting transporting vehicle tanks employed to transport soft drink syrups which present, in addition to the usual problems in transporting liquid filled tanks, a relatively high viscosity which causes the syrup to drain slowly from surfaces, a propensity for becoming very sticky upon drying, and the additional problems imposed by sanitation requirements.

With the valve assembly mounted as shown in FIG. 2, the head space in the tank above the surface of syrup contained in the tank is in constant communication with the atmosphere through opening 68, valve seat 48, the openings in baffle assembly 86 and the upper end of upper member 12. Upon surging of the liquid within the tank, syrup will enter lower member 14 via openings 68 and, as the level of syrup rises within member 14, float 54 is carried upwardly to seat against the inclined surface of valve seat 48 to thereby close the vent valve to prevent syrup from passing upwardly beyond valve plate 44. By forming the opening 68 through the vertical side walls of member 14 and closing the end of member 14 with plate 66, the flow of syrup into lower member 14 is impeded so that the interior of member 14 fills rather slowly. This is especially important in the case of violent surging to assure that the float valve closes in time to prevent any substantial amount of syrup from passing upwardly beyond valve plate 44. It also prevents a violent seating of float 54 on seat 48.

In order to insure freedom of movement of float 54, vanes 58 are spaced to provide a slight amount of clearance between guide surfaces 60 and float 54. This slight clearance makes possible a corresponding misalignment of the float with sealing surface 50. However, sealing member 48 is so designed that, as float 54 rises, it will first contact sealing lip 52 and, as differential pressure builds up tending to lift float 54 further, lip 52 is deflected upwardly to permit a portion of the hemispherical end 56 of float 54 to be seated against and on surface 50 which has a corresponding spherical curvature. Contact with lip 52 forms an initial seal of the valve, and guides float 54 into symmetrical seating relation with surface 50 thus compensating any slight imperfections in the hemispherical surface of float 54 or the spherical surface contour of sheet surface 50. Also, sealing lip 52 acts as a cushion to reduce the impact load against member 48 resulting from violent surging within member 14.

Even with float 54 seated on valve seat 48, the entire interior of lower member 14 can become entirely filled with syrup during surging and when the liquid level drops, the interior of member 14, vanes 58 and float 54 are coated with syrup. The relatively narrow area of contact between the vertical walls of float 54 and the vertical edges 60 of guide vanes 58 and the constantly maintained sliding engagement between edges 60 and float 54 prevents the engaged contacting surfaces from becoming coated to any great extent, this action being further assisted by the relatively high viscosity of the syrup.

In the event of violent surging which may cause some syrup to splash upwardly beyond valve seat 48 before float 54 can seat, the syrup which passes through valve seat 48 will strike the lower surface of splash guard 90. Because of the high viscosity and drying characteristics of the syrup, it is essential to prevent any syrup from reaching screen 84 since the syrup, upon drying, can readily clog the screen to an extent sufficient to substantially prevent venting of the tank. Direct exposure of the screen to splashing of the syrup is prevented primarily by splash guard 90. The tortuous passage upwardly through upper member 12 which is defined by baffle plates 92, 96 and 98 prevents syrup from contacting screen 84 in those situations where a fine spray or mist of syrup droplets is formed within the tank and carried toward screen 84 by air currents induced during the venting action.

When employed in soft drink syrup carrying tanks, the venting valve assembly disclosed in the application is subject to rigid requirements of sanitation. In this particular use, the metal parts of the venting valve assembly are constructed from stainless steel. Experience has found that the formation of valve seat 48 from gum rubber provides a more efficient action than is the case when valve seat 48 is constructed from synthetic materials.

It will be noted that with the valve assembly mounted in place upon the tank, the valve assembly can be easily disassembled from the exterior of the tank by detaching coupling 16 and successively removing upper member 12, with baffle assembly 86 and cap 108 in place, then valve plate 44 and float 54. Baffle assembly 86 and cap 108 may then be easily disassembled from upper member 12 by removing wing nut 112 and nut 104. This permits the upper member, screen, cap, baffle assembly, valve plate and float to be removed for individual cleaning. Lower member 14, which is now entirely open at its upper end can be easily cleaned in place.

Upon re-assembly of the structure, float 54 is first inserted into place, gasket 40 is then replaced, if necessary, on the upper end of lower member 14, valve plate 44 is placed in position and upper member 12, with baffle assembly 86 and cap 108 assembled, is placed in position. It will be noted that the annular protuberances on opposite sides of gasket 40 seat within the respective grooves formed in the upper and lower members to accurately locate these members in place, this action being further assisted by the interengagement between the peripheral edges of valve plate 44, the inner wall of lower member 14 and groove 42 in the lower end of upper member 12. With the parts positioned as shown, clamping assembly 16 is then placed in position and clamping screw 38 is tightened to rigidly clamp the parts together.

While an exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

We claim:

1. A vent valve assembly comprising vertically elongate upper and lower hollow tubular members, first means for detachably securing the lower end of the upper member to the upper end of the lower member whereby the hollow interior of said members cooperatively define a continuous venting passage, an annular valve seat of resilient material having a central opening through which the interiors of said respective members communicate, means detachably securing said valve seat with respect to the adjacent ends of said upper and lower members, a float member mounted in said lower member in operative relationship with said valve seat to close the opening therein to block said venting passage when liquid rises to a predetermined level within said lower member, a detachable baffle assembly mounted within said upper member including a first inverted cup-shaped member overlying said valve opening, a series of vertically spaced offset baffle plates disposed above said cup-shaped member, and stem means securing said cup-shaped member and said baffle plates in the aforementioned relationship with each other, a spider mounted on the upper end of said upper member, an umbrella-like cap, and second means on said stem means detachably securing said baffle assembly and said cap to said spider with said cap supported in spaced overlying and surrounding relationship with the upper end of said upper member.

2. For use in venting the interior of a liquid containing tank or the like, a vent valve assembly as defined in claim 1 further comprising mounting means on the exterior of said lower member spaced downwardly from the upper end thereof for mounting said valve assembly on a tank or the like with said first and said second means exposed at the exterior of the tank and said lower member projecting into the interior of the tank whereby said valve assembly may be disassembled for cleaning purposes from the exterior of the tank.

3. A vent valve assembly as defined in claim 1 wherein said annular valve seat member is secured about its outer periphery to a valve plate, the lower inner peripheral surface of said annular valve seat member being a downwardly and outwardly inclined sealing surface, and said float member having a hemispherical upper surface adapted to engage the inclined sealing surface of said annular sealing member.

4. A vent value assembly as defined in claim 1 wherein said float member includes a vertically elongate cylindrical central section terminating at its upper and lower ends in hemispherical end portions, and wherein said assembly includes guide means in said lower member comprising a plurality of vertically extending vanes having relatively narrow vertical guide edges slideably engaging the cylindrical central section of said float to guide said float into and out of seated engagement with an inner peripheral surface of said annular valve seat.

5. A vent valve assembly as defined in claim 1 wherein said annular valve seat has a lower inclined inner peripheral surface of spherical surface contour and a deflectable upper sealing lip extending radially inwardly beyond said inclined surface, and said float member includes a hemispherical upper end of size such that, upon upward movement of said float with respect to said seat, said hemispherical end first engages said lip to form an initial seal and, upon continued upward movement of said float with respect to said seat, deflects said sealing lip and seats against said lower inclined inner peripheral surface, the spherical contour of said hemispherical end and said lower inner peripheral surface corresponding to permit said lower surface to be fully engaged by said hemispherical end in sealing relation therewith.

6. A vent valve assembly comprising vertically elongate upper and lower hollow tubular members, first means for detachably securing the lower end of the upper member on the upper end of the lower member whereby the hollow interior of said members cooperatively define a continuous venting passage, a valve plate detachably secured between the adjacent ends of said members and having a central opening through which the interiors of the respective members communicate, an annular valve seat of resilient material mounted in said central opening, a float member mounted in said lower member for cooperating with said valve seat to close said central opening to block said venting passage when liquid rises to a predetermined level within said lower member, guide means for guiding said float member into and out of engagement with said valve opening, a plate secured to and extending completely across the lower end of said lower member, means defining inlet openings through the vertical side walls of said lower member above said plate, a screen mounted on the upper end of said upper member, baffle means detachably mounted in the interior of said upper member below said screen to prevent liquid from contacting said screen, and an umbrella-like cap mounted on the upper end of said upper member in spaced overlying and surrounding relationship with the upper end of said upper member.

7. For use in combination with a closed liquid containing tank wherein the liquid is subject to surging, a vent valve assembly for venting the head space in said tank above the surface of liquid contained therein, said vent valve comprising a first elongate hollow tubular member having vertical side walls, means for mounting said first member in the upper wall of said tank with the lower end of said first member projecting downwardly into the interior of the tank and the upper end of said first member projecting upwardly from the upper wall of the tank at the exterior thereof, a horizontal plate secured to the lower end of the first member and extending entirely across the lower end of said first member, means defining inlet openings in the vertical wall of said first member adjacent the lower end thereof to provide communication between the interior of said tank and the interior of said first member, a valve plate mounted upon the upper end of said first member and having a central opening therethrough, an annular valve seat of resilient material mounted in said central opening, a vertically elongate float having a vertically elongate cylindrical central portion and a hemispherical end portion mounted in the interior of said first member, the hemispherical end portion of said float being adapted to seat within said valve seat to close said opening when liquid rises to a predetermined level within said lower member, vertically elongate guide vanes mounted in the interior of said first member and slideably engaging the cylindrical central portion of said float to guide said float into and out of engagement with said valve seat, a second elongate hollow tubular member having its lower end mounted upon the upper end of said first member, clamping means for detachably clamping said valve plate and said second tubular member in assembled relationship upon said first tubular member, a screen mounted upon and extending across the upper end of said second tubular member, and baffle means detachably mounted within said second tubular member for preventing liquid from said tank from contacting said screen while affording free passage of air through said valve assembly from said inlet openings through said screen when said float is spaced from said valve plate.

8. A vent valve assembly as defined in claim 7 wherein said baffle means comprises a vertical central stem, an inverted cup-shaped splash guard mounted upon the lower end of said stem, a first horizontal baffle plate mounted on said stem and having an outer peripheral edge spaced from the interior wall of said second member, a pair of horizontally extending second baffle plates supported respectively above and below said first baffle plate, said second plates having outer peripheral edges adapted to engage the interior wall of said second tubular member and having central openings therethrough, the diameter of said central openings in said second baffle plates being substantially less than the outer diameter of the first mentioned baffle plate, a spider mounted upon the upper end of said second tubular member, an umbrella-like cap adapted to be supported upon said spider with said cap extending in spaced overlying end surrounding the relationship with the upper end of said second member, and means on said stem for detachably securing said baffle assembly and said cap to said spider.

9. A vent valve assembly comprising vertical tubular means defining a venting passage having an inlet at its lower end and an outlet at its upper end, an annular valve seat having a central opening and secured intermediate the ends of said tubular means, a float member mounted in the lower part of said tubular means in operative relationship with said valve seat to close the opening therein to block said venting passage when liquid rises to a pre-determined level within said tubular means below the valve seat, a detachable baffle assembly mounted within the upper part of said tubular means including a first inverted cup-shaped member overlying said opening in the valve seat, a series of vertically spaced offset baffle plates disposed above said cup-shaped member, and stem means securing said cup-shaped member and said baffle plates in the aforementioned relationship wtih each other, a spider mounted on the upper end of said tubular means, an umbrella-like cap, and second means on said stem means detachably securing said baffle assembly and said cap to said spider with said cap supported in spaced overlying and surrounding relationship with the upper end of said tubular means.

References Cited in the file of this patent
UNITED STATES PATENTS

| | | |
|---|---|---|
| 1,154,385 | Davis | Sept. 21, 1915 |
| 2,069,714 | Getchell | Feb. 2, 1937 |
| 2,247,930 | Turner | July 1, 1941 |
| 2,284,354 | Acly | May 26, 1942 |
| 2,625,169 | Parrish | Jan. 13, 1953 |
| 2,725,071 | McKillop | Nov. 29, 1955 |
| 3,091,254 | Kilayko | May 28, 1963 |